United States Patent
Yeo

(10) Patent No.: US 7,607,710 B2
(45) Date of Patent: Oct. 27, 2009

(54) FOLDING MONITOR FOR VEHICLES

(75) Inventor: Bu Geun Yeo, Daegu (KR)

(73) Assignee: Hyundai Motor Company, Seoul (KR)

( * ) Notice: Subject to any disclaimer, the term of this patent is extended or adjusted under 35 U.S.C. 154(b) by 47 days.

(21) Appl. No.: 11/971,562

(22) Filed: Jan. 9, 2008

(65) Prior Publication Data

US 2009/0001747 A1    Jan. 1, 2009

(30) Foreign Application Priority Data

Jun. 26, 2007    (KR) .................... 10-2007-0063142

(51) Int. Cl.
*B60R 11/06* (2006.01)
(52) U.S. Cl. ..................... 296/37.8; 248/917
(58) Field of Classification Search ............... 296/37.8; 248/917, 919, 920
See application file for complete search history.

(56) References Cited

U.S. PATENT DOCUMENTS

| 4,601,561 | A | * | 7/1986 | Yamashita | 396/178 |
| 4,980,947 | A | * | 1/1991 | McQuigge | 16/235 |
| 5,491,930 | A | * | 2/1996 | La See | 49/252 |
| 5,494,447 | A | * | 2/1996 | Zaidan | 439/31 |
| 6,157,418 | A | * | 12/2000 | Rosen | 296/37.7 |
| 6,402,109 | B1 | * | 6/2002 | Dittmer | 248/284.1 |
| 6,665,175 | B1 | * | 12/2003 | deBoer et al. | 248/920 |
| 7,089,992 | B2 | * | 8/2006 | Walter et al. | 160/370.22 |
| 7,137,676 | B2 | * | 11/2006 | Sugimoto et al. | 312/7.2 |
| 2005/0189461 | A1 | * | 9/2005 | Peng | 248/917 |
| 2007/0040403 | A1 | * | 2/2007 | Yang | 296/37.8 |
| 2009/0008526 | A1 | * | 1/2009 | Yeo | 248/323 |

* cited by examiner

*Primary Examiner*—Kiran B. Patel
(74) *Attorney, Agent, or Firm*—Morgan, Lewis & Bockius LLP

(57) ABSTRACT

A folding monitor for vehicles is provided. The folding monitor for vehicles includes: a frame provided in a vehicle body; and a display unit provided at the frame, wherein one end of an arm is hinge-coupled to at least one side of the display unit, and a slot into which the other end of the arm is coupled to rotate is formed in the frame, wherein a rotation motion part and a linear motion part are formed in the slot, and a guide plate inserted into the rotation motion part, rotating and linearly moving along the linear motion part, is formed at an end part of the arm hinge-coupled to the slot. Therefore, noise can be reduced and durability of a product can be improved by preventing the display unit from being separated from the frame and shaken due to vehicle vibration and an external impact.

9 Claims, 7 Drawing Sheets

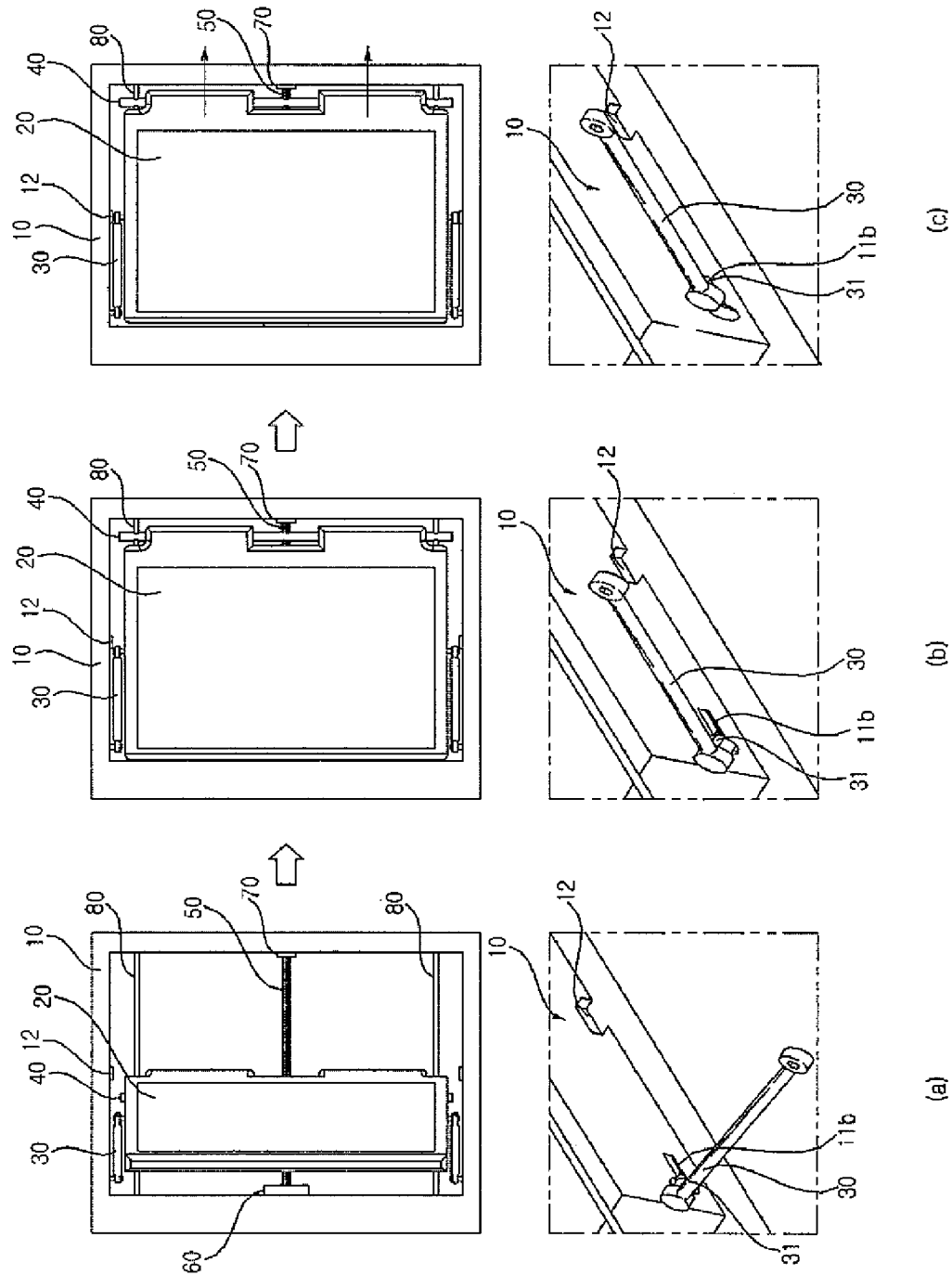

FOLDING MONITOR FOR VEHICLES

This application claims the benefit of Korean Application No. 10-2007-0063142, filed on Jun. 26, 2007 in the Korean Intellectual Property Office, the disclosure of which is incorporated herein by reference.

BACKGROUND OF THE INVENTION

1. Field of the Invention

The present invention relates to a folding monitor for vehicles, and more particularly, to a folding monitor for vehicles in which a circular groove and a quadrangular groove are formed in a slot formed in at least a side of a frame and in which a guide plate inserted into the circular groove, rotating in the circular groove and linearly moving along the quadrangular groove, is formed at an lower end part of an arm hinge-coupled to the slot.

2. Description of the Related Art

FIG. 1 is a plan view illustrating an opened state of a conventional folding monitor for vehicles. FIG. 2 is a plan view illustrating a closed state of the folding monitor for vehicles shown in FIG. 1. FIG. 3 is a perspective view illustrating a shape of an arm of a conventional folding monitor for vehicles. FIG. 4 is a perspective view illustrating a shape of a slot hinge-coupled to the arm shown in FIG. 3.

As shown in FIGS. 1 to 4, the conventional folding monitor for vehicles includes a frame 1 in which an arrival portion is formed on a lower portion of the frame 1 and in which a slot 1a is formed in a longitudinal direction at both inner sides of the arrival portion of the frame 1; a display unit 2 in which rotation shafts 2a are protruded from both sides thereof; arms 3 whose one lower ends including the lower rotation shaft 3a are hinge-coupled to the slots 1a of the frame 1 and whose the upper ends are hinge-coupled to the upper rotation shafts 2a of the display unit 2; a moving bar 4 inserted in a horizontal direction of the display unit 2 at a rear end portion of the display unit 2 and in which a screw groove is formed therein; a rotation shaft 5 perpendicularly coupled to a screw groove of the moving bar 4 formed with a threaded coupling structure wherein the screw thread is formed on an outer surface thereof; and a motor 6 coupled to one distal end of the rotation shaft 5 to apply rotary power to the rotation shaft 5.

An operation of the conventional folding monitor for vehicles having the above-described configuration is as follows.

If the motor 6 receives an electric signal from a controller, the motor 6 rotates the rotation shaft 5 whose one distal end is connected to the motor 6 and whose the proximate end is coupled to a bearing 7.

Because an outer surface of the rotation shaft 5 is formed in a threaded structure, the moving bar 4 having a screw groove (not shown) perpendicularly coupled to the threaded structure of the rotation shaft 5 with moves toward the arrival portion of the frame 1 along guide rails 8 provided substantially near to both lateral sides of the frame 1 if the rotation shaft 5 rotates.

As the moving bar 4 moves toward the arrival portion of the frame 1, a rear end portion of the display unit 2 into which the moving bar 4 is inserted also moves toward the arrival portion of the frame 1.

When the rear end portion of the display unit 2 moves toward the arrival portion of the frame 1, the arms 3 whose upper ends are hinge-coupled to the upper rotation shafts 2a protruded from both sides of the display unit 2 and whose lower ends having a lower rotation shafts 3a are hinge-coupled to the slots 1a formed at both lateral sides of the arrival portion of the frame 1 determines a rotation radius of the display unit 2. The display unit 2 is opened by rotation with respect to the upper rotation shaft 2a of the arm 3 while the lower rotation shaft 3a are interlocking with the upper rotation shaft 2a by the arm 3 to permit pivotal rotation of the arm 3 with regard to the lower rotation shaft 3a.

A closing process of the display unit 2 is performed by a reverse rotation of the motor 6 and is performed in a reverse order of an opening process of the display unit 2.

However, in the conventional folding monitor for vehicles, as the display unit is separated from the body, it is easily influenced by vehicle vibration and an outside impact and shaking and thus noise is generated and durability of a product deteriorates.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The present invention has been made in an effort to solve the above problems, and the present invention provides a folding monitor for vehicles that can reduce noise and improve durability of a product by preventing a display unit from being separated from a frame and thus being shaken due to vehicle vibration and an external impact.

According to an aspect of the present invention, there is provided a folding monitor for vehicles including: a frame provided in a vehicle body; a display unit provided to open and close in the frame, wherein one upper end part of an arm is hinge-coupled to at least one lateral side of the display unit; a slot into which the lower end part of the arm is inserted to rotate is formed in the arrival portion of the frame, wherein the slot comprises a rotation motion part and a linear motion part; and a guide plate inserted into the rotation motion part to rotate and the linear motion part to linearly move along the linear motion part, is formed at an lower end part of the arm hinge-coupled to the slot.

The rotation motion part of the slot may be formed in a circular groove, and the linear motion part of the slot may be formed in a long quadrangular groove extending along the longitudinal direction of the frame 1 from the circular groove.

A guide recess recessed substantially from the middle portion of the surface of the circular groove and the quadrangular groove toward the outside may be formed along the middle portion of the surface of the circular groove and the quadrangular groove. The guide recess comprises a circular guide recess and a quadrangular guide recess.

The guide plate may be formed in a circular shape apart by a predetermined interval toward the circular groove from the lower end part of the arm hinge-coupled to the slot.

A first linear guide of a quadrangular shape may be formed between the lower end part of the arm hinge-coupled to the slot and the guide plate, and a second linear guide of a quadrangular shape may be protruded from the outside surface of the guide plate.

The guide plate may be inserted into a guide recess formed in the circular groove so that an outer circumferential surface of the guide plate may rotate along the circular guide recess, and the guide plate may linearly move with being inserted along the quadrangular guide recess formed in the quadrangular groove.

The first linear guide and the second linear guide may guide the guide plate of the arm while contacting with side surfaces of the quadrangular groove when the guide plate moves along the guide recess of the quadrangular groove.

The guide plate may be made of an elastic material, and the outer circumferential surface of the guide plate may be inserted into the guide recess after being inserted into the circular groove first.

A protruded portion for fastening the upper end part of the arm hinge-coupled to the display unit may be formed in at least one side of the frame when the first linear guide and the second linear guide are moved towards the proximate end of the quadrangular groove.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWING

The above and other features of the present invention will now be described in detail with reference to certain exemplary embodiments thereof illustrated the accompanying drawings which are given hereinbelow by way of illustration only, and thus are not limitative of the present invention, and wherein:

FIG. 7 illustrates a process of fixing a folding monitor with a protruded portion for vehicles according to the present invention.

Figure 1:
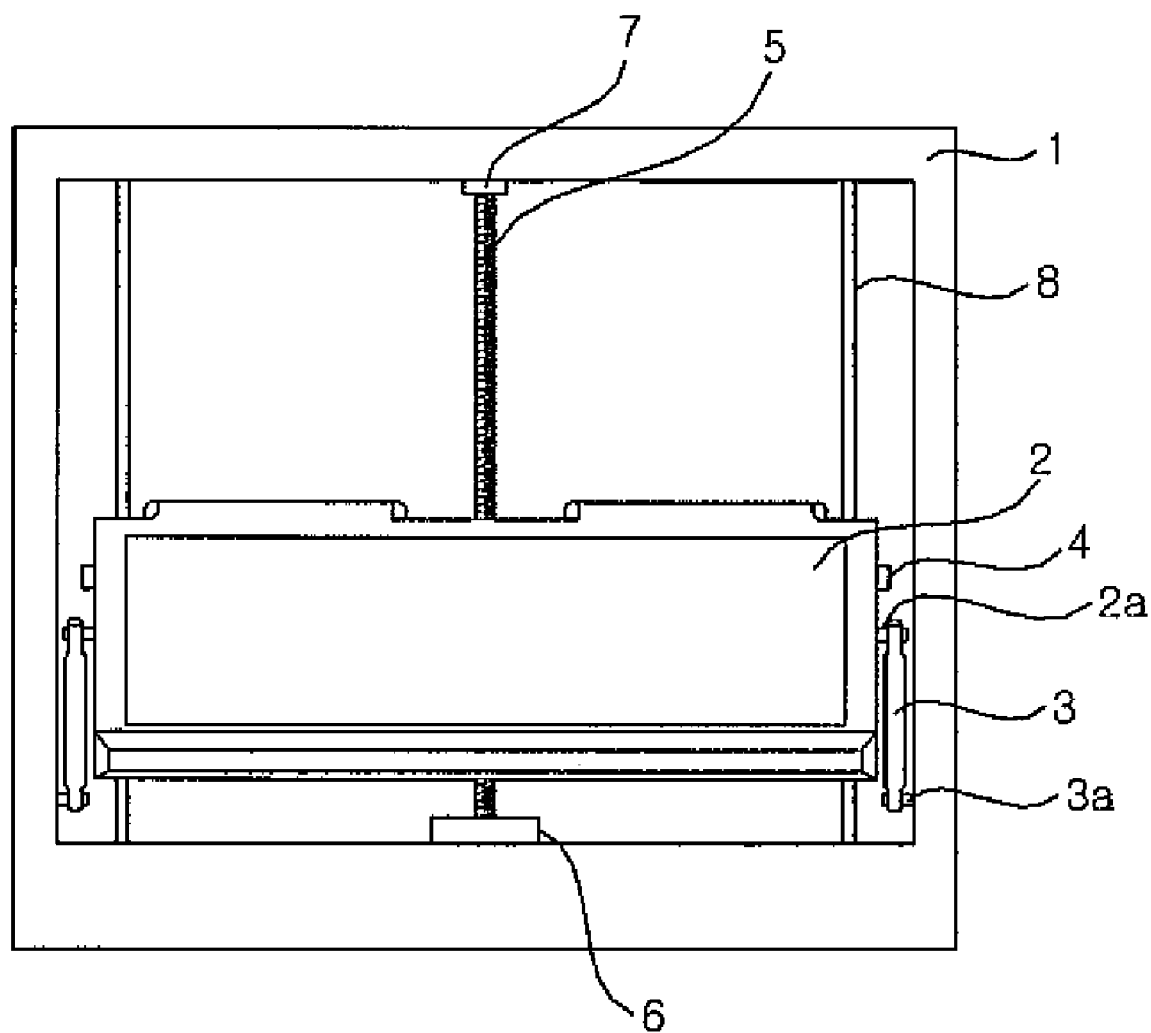
FIG. 1 is a plan view illustrating an opened state of a conventional folding monitor for vehicles.
Figure 2:
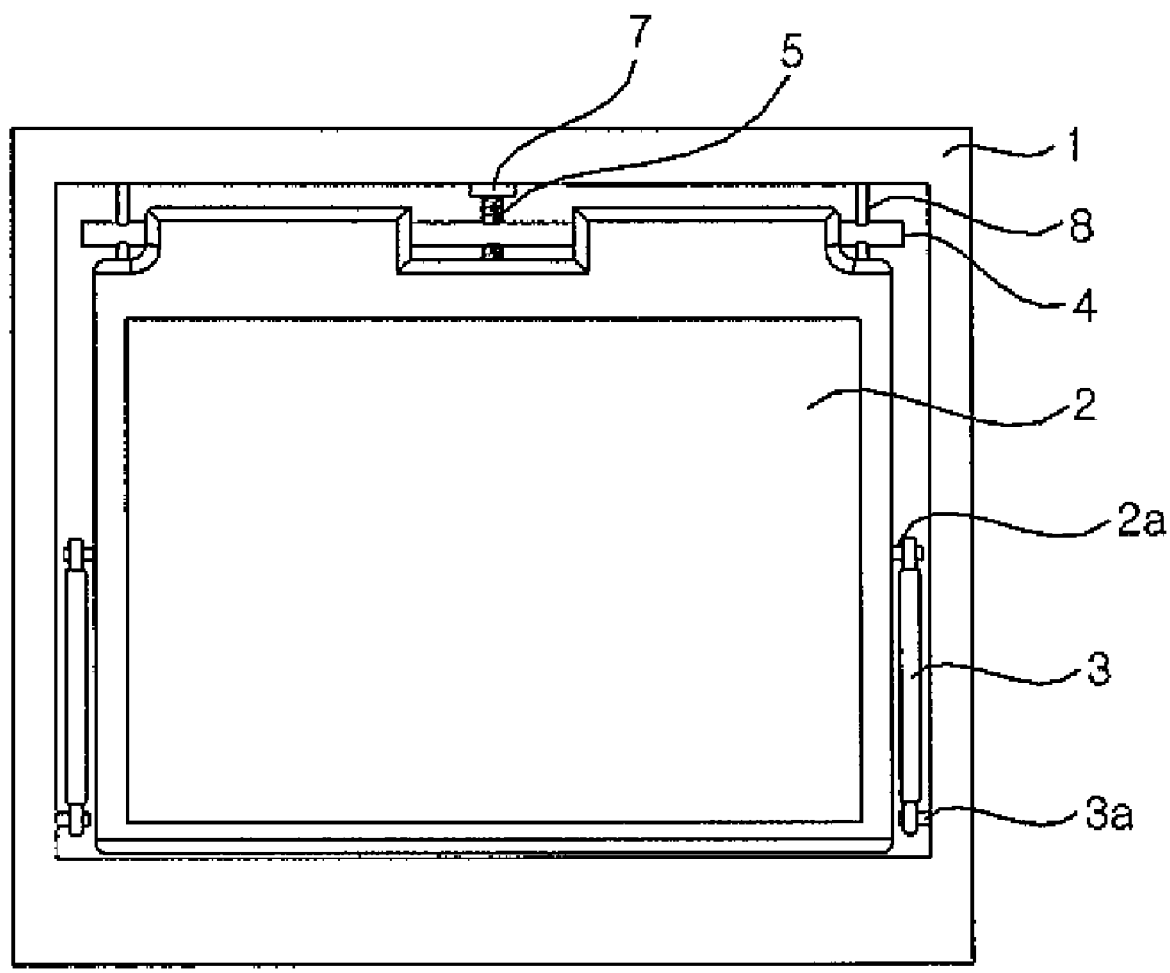
FIG. 2 is a plan view illustrating a closed state of the folding monitor for vehicles shown in FIG. 1.
Figure 3:
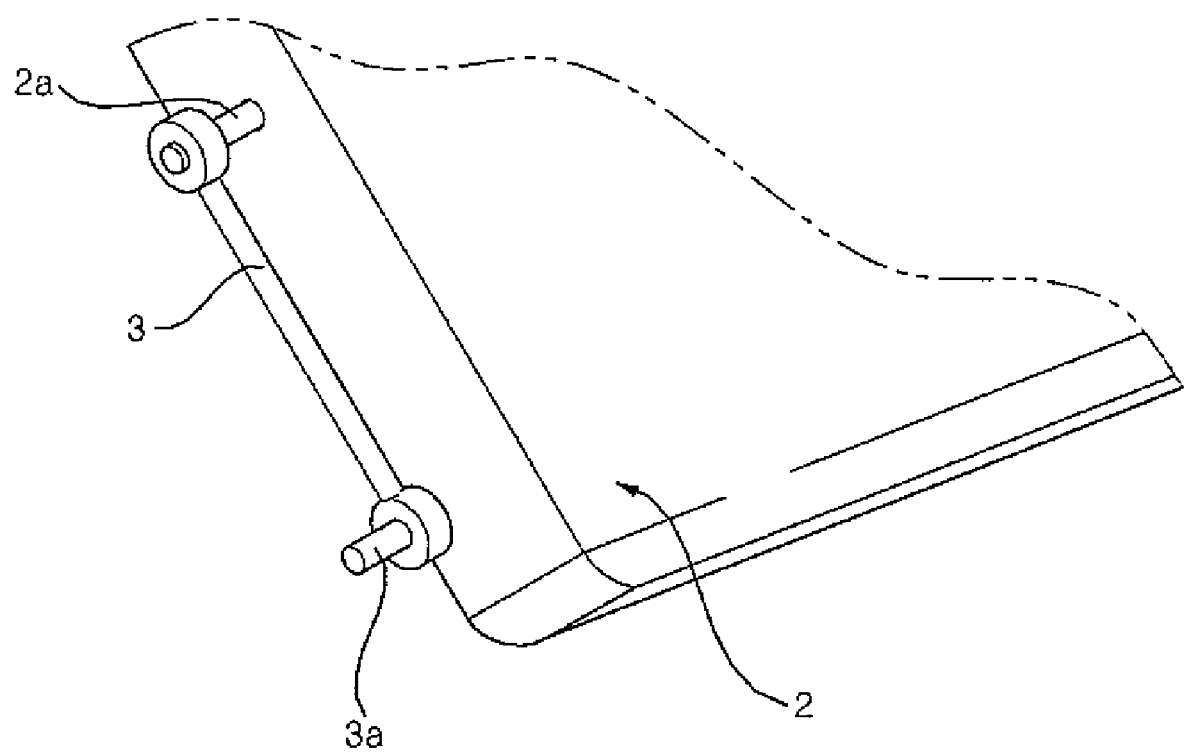
FIG. 3 is a perspective view illustrating a shape of an arm of a conventional folding monitor for vehicles.
Figure 4:
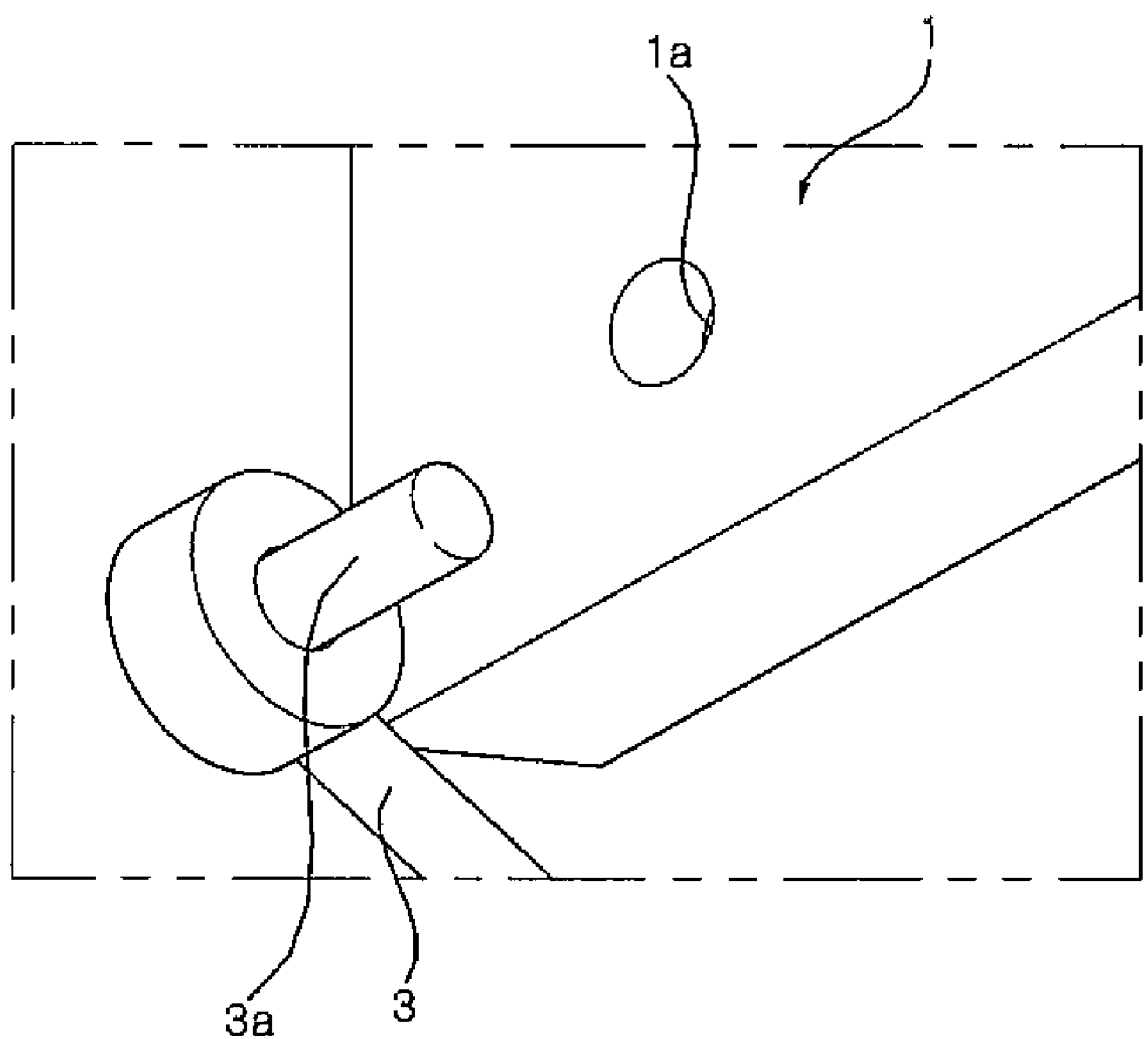
FIG. 4 is a perspective view illustrating a shape of a slot hinge-coupled to the arm shown in FIG. 3.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE PREFERRED EMBODIMENT

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of a folding monitor for vehicles according to the present invention will be described in detail with reference to the accompanying drawings.

Figure 5:
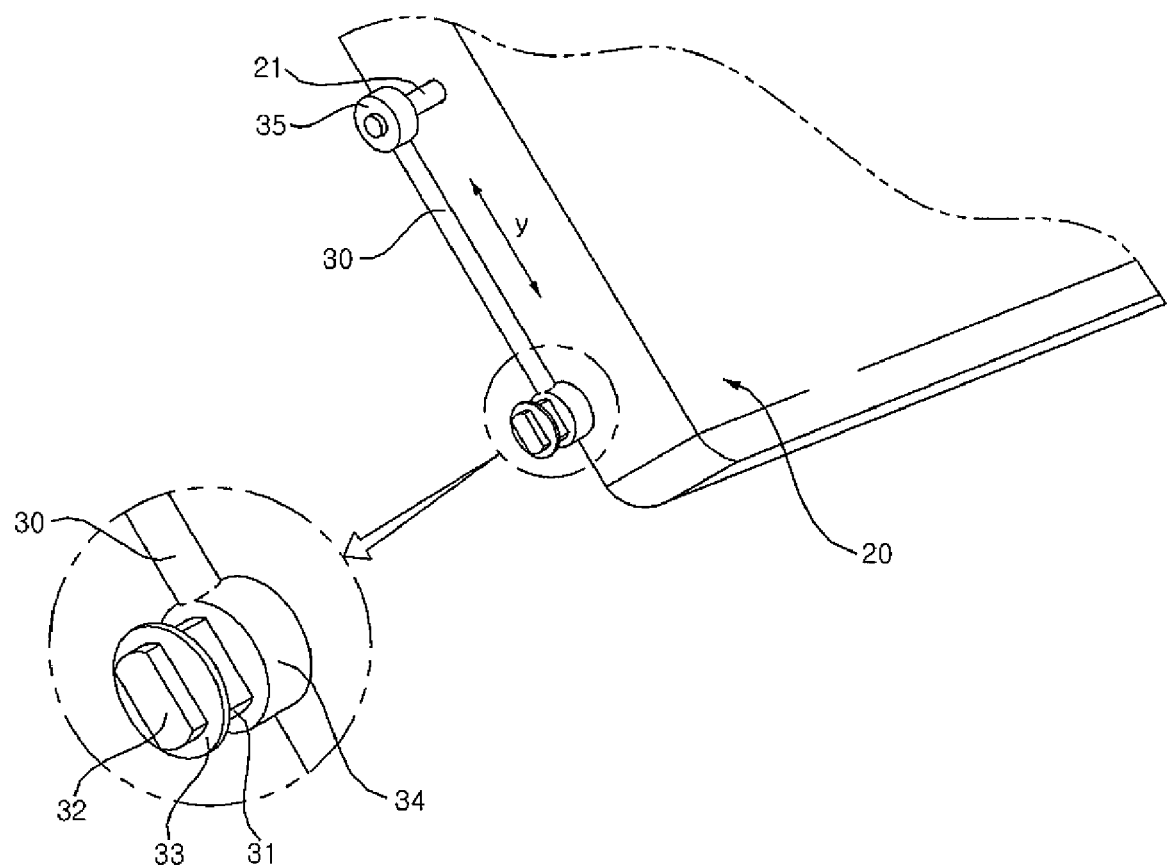
FIG. 5 is an enlarged perspective view illustrating a shape of an arm of a folding monitor for vehicles according to the present invention.
Figure 6:
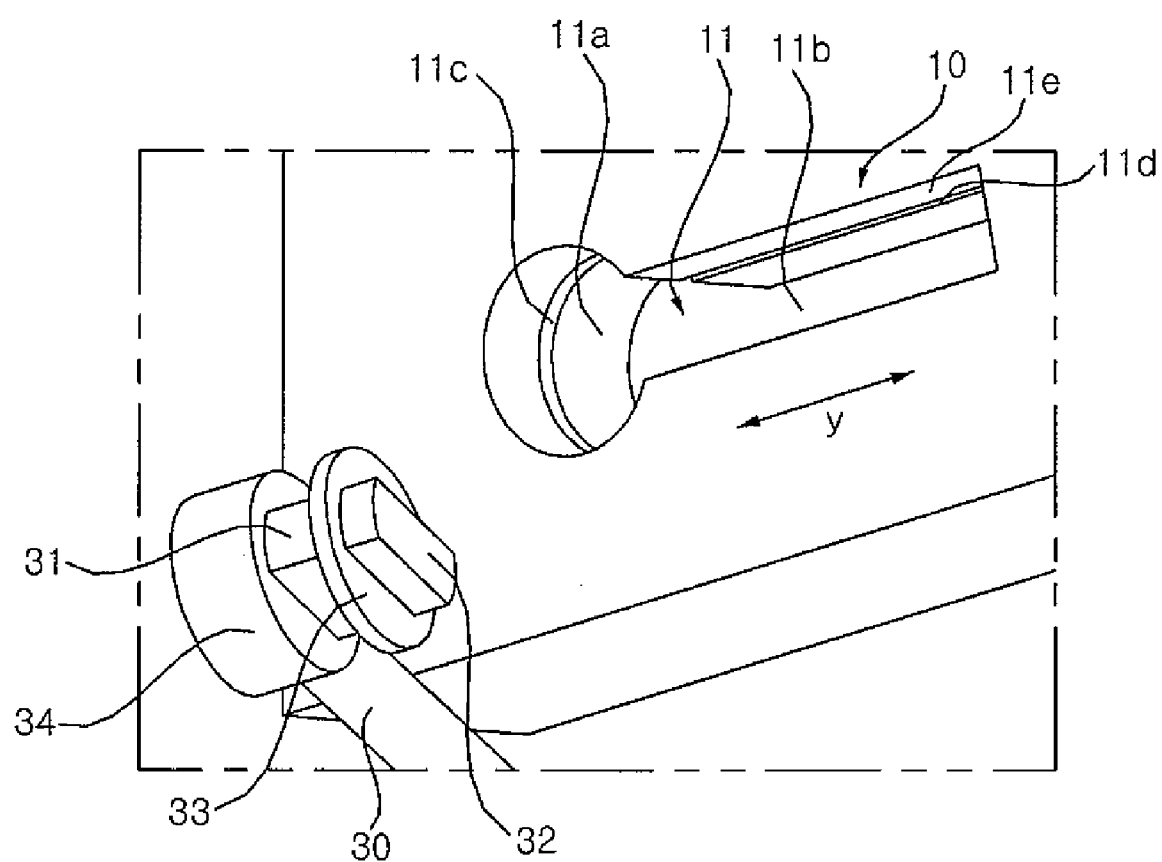
FIG. 6 is a perspective view illustrating a shape of a slot hinge-coupled to the arm shown in FIG. 5.

FIG. 5 is an enlarged perspective view illustrating a shape of an arm of a folding monitor for vehicles according to the present invention. FIG. 6 is a perspective view illustrating a shape of a slot hinge-coupled to the arm shown in FIG. 5. FIG. 7 illustrates a process of fixing a folding monitor with a protruded portion for vehicles according to the present invention.

As shown in FIGS. 5 to 7, the folding monitor for vehicles includes a frame 10 provided in a vehicle body; and a display unit 20 provided to open and close in the frame 10, wherein one end of an arm 30 is hinge-coupled to at least one lateral side of the display unit 20, and at least a slot 11 into which the other end of the arm 30 is inserted to rotate is formed at the arrival portion of the frame 10, wherein a rotation motion part and a linear motion part are formed in the slot 11, and a guide plate 33 inserted into and rotating in the rotation motion part of the slot 11 and linearly moving along the linear motion part of the slot 11 is formed at the lower end part 34 of the arm hinge-coupled to the slot 11.

The rotation motion part of the slot 11 is formed in a circular groove 11a, and the linear motion part of the slot 11 is formed along a long quadrangular groove 11b extending along the longitudinal direction (y) of the frame 10 from the circular groove 11a. Guide recesses (11c, 11d) recessed from the middle portion of the circular groove 11a and the quadrangular groove 11b measuring toward the outside are formed in the middle portion of circular groove 11a and the quadrangular groove 11b as shown in FIG. 6. The guide recesses comprise a circular guide recess 11c and quadrangular guide recess 11d.

The guide plate 33 is formed in a circular shape apart by a predetermined interval toward the circular groove 11a from the lower end part 34 of the arm 30 hinge-coupled to the slot 11. A first linear guide 31 of a quadrangular shape is formed between the lower end part 34 of the arm 30 and the guide plate 33. A second linear guide 32 is protruded from the outer surface of the guide plate 33 along the axial direction of the guide plate 33. In an exemplary embodiment of the present invention, the second linear guide 32, guide plate 33 and first linear guide 31 may be arranged each other co-axially.

The guide plate 33 is inserted into the circular guide recess 11c formed in the circular groove 11a so that an outer circumferential surface of the guide plate 33 may rotate along the circular guide recesses 11c. The inserted guide plate 33 may linearly move in the longitudinal direction (y) of the frame 10 with being inserted in the quadrangular guide recess 11d formed in the quadrangular groove 11b. The first linear guide 31 and the second linear guide 32 are configured to linearly guide the guide plate 33 of the arm 30 while contacting with side surfaces of the quadrangular groove 11b when the guide plate 33 moves along the quadrangular guide recess 11d of the quadrangular groove 11b.

The guide plate 33 may be made of an elastic material, and an outer circumferential surface of the guide plate 33 is inserted into the quadrangular guide recess 11d after being inserted into the circular guide recess 11c, and a protruded portion 12 for fixing an upper end part 35 of the arm 30 hinge-coupled to the display unit 20 is formed at least a side of the frame 10 when the first linear guide 31 and the second linear guide 32 are moved to the proximate end of the quadrangular groove 11b to close the display unit 20.

In the present exemplary embodiment, a case where the guide recesses (11c, 11d) are formed in the slot 11 is described, however a case where the guide recesses (11c, 11d) are not formed and the guide plate 33 is inserted into the circular groove 11a may be considered in another exemplary embodiment.

An operation of the folding monitor for vehicles according to the present invention having the above-described configuration is as follows.

If a motor 60 that receives an electric signal from a controller (not shown) to open the display unit 20, the motor 60 rotates a rotation shaft 50 whose one end is connected to the motor 60 and whose other end is coupled to a bearing 70. Because an outer surface of the rotation shaft 50 has a threaded structure, a moving bar 40 having a screw groove complementarily-coupled to the rotation shaft 50 with a threaded structure moves toward the arrival portion of the frame 10 along guide rails 80 provided substantially in the lateral side portions of the frame 10.

As the moving bar 40 moves to the arrival portion of the frame 10, a rear end portion of the display unit 20 into which the moving bar 40 is inserted also moves toward the arrival portion of the frame 10. At this time, the lower end part 34 of the arm 30 hinge-coupled to the slot 11 formed at both sides of the arrival portion of the frame 10 moves along the quadrangular guide recess 11d in the quadrangular groove 11b towards the circular groove 11a wherein the circular guide recess 11c may be formed at the arrival portion of the frame 10 in an exemplary embodiment of the present invention.

As the moving bar 40 further moves to the arrival portion of the frame 10, the first and second linear guides (31, 32) of the lower end part 34 of the arm 30 pivotally rotate with respect to the rotational axis of the circular groove 11a while the display unit 20 is opened by rotating with respect to the upper rotation shaft 21 of the arm 30 while the lower end of arm 30 are interlocking with the upper rotation shaft 21 by the arm 30 to permit pivotal rotation of the arm 3. The rotation radius of the display unit 20 may be determined according to a length of the arm 30.

A closing process of the display unit 20 is performed by a reverse rotation of the motor 60, and the display unit 20 is closed in a reverse order of an opening process thereof, as shown in detail in FIG. 7.

That is, after the display unit 20 is completely opened in the arrival portion of the frame 10, the motor 60 rotates reversely the rotating shaft 50 according to the signal of the controller until the first and second linear guides (31, 32) formed at the lower end part 34 of the arm 30 hinge-coupled to the slot 11 reaches to the proximate end portion of quadrangular groove 11b of the slot 11. At this time, the upper end part 35 of the arm 30 hinge-coupled to the display unit 20 is aligned to be fastened to the protruded portion 12 formed at both sides of the frame 10 to support the upper end part 35 and thus the display unit 20 is fastened more firmly to the frame 10.

As described above, according to the present invention, the folding monitor for vehicles includes: a frame provided in a vehicle body; and a display unit provided to open and close in the frame, wherein one end of an arm is hinge-coupled to at least one lateral side of the display unit, and a slot into which the other end of the arm is coupled to rotate is formed at the arrival portion of the frame, wherein a rotation motion part and a linear motion part are formed in the slot, and a guide plate inserted into the rotation motion part, rotating and linearly moving along the linear motion part, is formed at the lower end part of the arm hinge-coupled to the slot. Therefore, noise can be reduced and durability of a product can be improved by preventing a phenomenon that the display unit is separated from a frame and is shaken due to vehicle vibration and an external impact.

Further, because a protruded portion for preventing movement of an end part of the arm hinge-coupled to the display unit is formed at both sides of the frame, the display unit is fixed more firmly to the frame.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the Claims appended hereto and their equivalents.

What is claimed is:

1. A folding monitor for vehicles comprising:
    a frame provided in a vehicle body;
    a display unit provided to open and close in the frame,
    at least a slot formed in the frame comprising a rotation motion part and a linear motion part,
    at least an arm comprising a guide plate formed at lower end part of the arm hinge-coupled to the slot wherein upper end part of the arm is hinge-coupled to at least one side of the display unit, and wherein the guide plate is inserted into the rotation motion part and rotates in the linear motion part and linearly moves along the linear motion part.

2. The folding monitor for vehicles of claim 1, wherein the rotation motion part of the slot is formed in a circular groove, and the linear motion part of the slot is formed in a long quadrangular groove extending along the longitudinal direction of the frame from the circular groove.

3. The folding monitor for vehicles of claim 2, wherein a guide recess recessed substantially from the middle portion of the circular groove and the quadrangular groove toward the outside is formed in the circular groove and the quadrangular groove.

4. The folding monitor for vehicles of claim 2, wherein the guide plate is formed substantially in a circular shape apart by a predetermined interval toward the circular groove from the lower end part of the arm hinge-coupled to the slot.

5. The folding monitor for vehicles of claim 4, wherein a first linear guide of a quadrangular shape is formed between the lower end part of the arm hinge-coupled to the slot and the guide plate, and a second linear guide is protruded from the outside surface of the guide plate.

6. The folding monitor for vehicles of claim 3, wherein the guide plate is inserted into the guide recess formed in the circular groove so that an outer circumferential surface of the guide plate may rotate along the guide recess, and the guide plate linearly moves with being inserted along the guide recess formed in the quadrangular groove.

7. The folding monitor for vehicles of claim 3 or 5, wherein the first linear guide and the second linear guide guide the guide plate while contacting with side surfaces of the quadrangular groove when the guide plate moves along the guide recess of the quadrangular groove.

8. The folding monitor for vehicles of claim 3, wherein the guide plate is made of an elastic material, and the outer circumferential surface of the guide plate is inserted into the guide recess after being inserted into the circular groove.

9. The folding monitor for vehicles of claim 5, wherein a protruded portion for fastening the upper end part of the arm hinge-coupled to the display unit is formed in at least one lateral side of the frame when the first linear guide and the second linear guide are moved along the quadrangular groove.

* * * * *